United States Patent [19]

Smith et al.

[11] Patent Number: 5,533,124

[45] Date of Patent: Jul. 2, 1996

[54] ELECTRONIC TRADING CARD SYSTEM

[76] Inventors: Jeannette K. Smith, 10785 S. Pine Dr., Parker, Colo. 80210; Janet L. Roucis, 1122 S. Flower Cir., Lakewood, Colo. 80232

[21] Appl. No.: 351,026

[22] Filed: Dec. 7, 1994

[51] Int. Cl.$^6$ ..................................................... H04K 1/00
[52] U.S. Cl. ............................ 380/4; 380/25; 364/479.01
[58] Field of Search .......................... 380/4, 25; 364/479

[56] References Cited

U.S. PATENT DOCUMENTS

| | | | |
|---|---|---|---|
| 4,446,519 | 5/1984 | Thomas | 364/300 |
| 4,558,176 | 12/1985 | Arnold et al. | 178/22.08 |
| 4,568,093 | 4/1987 | Hellman | 380/4 |
| 4,584,641 | 4/1986 | Guglielmino | 380/4 |
| 4,590,557 | 5/1986 | Lillie | 364/200 |
| 4,646,234 | 2/1987 | Tolman et al. | 364/200 |
| 4,796,200 | 1/1989 | Wolfe | 364/900 |
| 4,823,308 | 4/1989 | Knight | 364/900 |
| 4,924,378 | 5/1990 | Hershey et al. | 364/200 |
| 5,014,234 | 5/1991 | Edwards, Jr. | 364/900 |
| 5,109,413 | 4/1992 | Comerford et al. | 380/4 |
| 5,166,886 | 11/1992 | Molnar et al. | 364/479 |

*Primary Examiner*—David C. Cain
*Attorney, Agent, or Firm*—Duft, Graziano & Forest

[57] ABSTRACT

Computer implemented trading cards are disclosed. Trading card software is stored on a removable medium in a copy protected form. The trading card software includes trading card data and an executable computer program. Each removable medium contains trading card data that is specific to a particular individual or character or any other person, place, or thing. The trading card software is interactive. The computer user is able to select one of a number of predetermined displays by selecting interactivity areas on each display. A combination of copy protect schemes are utilized, including non-standard data formatting, encryption and sector modification. After use of the computer program is stopped, trading card data transferred to any storage device of the user's computer system during operation is then removed to prevent storing of the trading card data on any medium other than the removable medium.

16 Claims, 9 Drawing Sheets

ELECTRONIC TRADING CARD SYSTEM

FIELD OF THE INVENTION

The present invention relates to copy protecting software and data, and in particular, to an electronic trading card system having audio and visual subject displays, a removable media for portability, and copy protection to maintain authenticity authorized removable media originals.

BACKGROUND OF THE INVENTION

Trading cards have been available for a number of years primarily in the field of sports, such as baseball, basketball, football, hockey, etc. Baseball player trading cards, for example, include a picture of the baseball player and statistics related to the baseball player's performance. A number of trading cards are commonly contained in the same package. Typically, when such a package of trading cards is purchased, the customer does not know before the package is opened which baseball players' cards are in the package. Consequently, in the case in which the customer already has one of the baseball cards that was just purchased, a well-known option that the customer typically has is to trade this baseball card for another baseball card that he does not have.

Trading cards presently are available in a hard copy format that does not offer interactivity, motion and sound. With the ever-expanding usage of computers and resulting computer displays, especially by the young, a new form of trading card presentation has been devised. In particular, a multimedia computer system, together with trading card software and subject data, enhances the trading card format and offers advantages not found with hard copy trading cards. In creating this new trading card, a key factor relates to reducing the ability and likelihood of copying the trading card. Unlike hard copy trading cards that are inherently impractical for the individual card owner to copy, trading card software is more readily duplicatable. That is, in the absence of any full or substantial copy protection, it is relatively straightforward to copy software between or among different storage media. The concern arises, therefore, that individual collectors of the trading cards, implemented using trading card software, will merely copy each others individual trading cards embodied in software onto their own storage media, such as a hard disk. If such a copying practice is easily available, the suppliers of the trading card software would have extreme difficulty in marketing their trading cards, especially where enforcement of laws protecting against such copying is impractical and/or cost prohibitive.

In addition to trading cards directed to sport personalities, it would also be advantageous to provide trading card software and subject data directed to other well-known individuals, such as action heroes or other television or movie personalities, or any person, place, or thing. The trading card software is also applicable to imaginary characters, such as cartoon characters.

SUMMARY OF THE INVENTION

A method and a system are provided for copy protecting, interactively displaying, dynamically and statically, real and/or imaginary individuals or characters, places, or things, together with producing sounds associated with the visual displays. The system includes a storage medium and a computer system for receiving the storage medium. The storage medium stores trading card software. In one embodiment, the trading card software includes trading card subject data for only one individual or character. The trading card software also includes a computer program for use in displaying the subject of trading card data. The storage medium is relatively inexpensive and is removable from the computer system. A floppy disk currently meets those requirements. Since there is only one individual, or at most a few individuals or characters, stored on the removable medium in the form of a trading card data, in marketing the trading card software, a number of removable storage media, each having trading card software software data associated with a different individual or character, would be packaged together.

The trading card data preferably includes data for producing graphics, written text, sound and action video in which the trading card individual or personality is displayed in action, such as a baseball player striking a ball and/or running around the bases. The computer program that executes the trading card data is configured for interactive use by the computer user. That is, for example, the trading card software can be configured or defined such that the trading card data has "two sides," just like a hard copy baseball card. With respect to the data associated with a "first side," a picture or photograph of the individual is displayable. The "second side" of the particular trading card is associated with a display of ballplayer statistics. Other displays include an illustration of the individual in action, whether it is playing baseball or basketball, or fighting the forces of evil.

The trading card software, especially the trading card data, is stored on the removable medium in accordance with a number of copy protect schemes. In one embodiment, the trading card data is arranged on the removable medium in accordance with a non-standard format. This format is different from the standard data format or arrangement that would typically be found on a storage medium associated with a particular computer system platform. Additionally, the trading card software data is encrypted in accordance with an established encryption technique. To further copy protect, the removable medium has one or more modified sectors associated with it so that the trading card data is not stored thereon in a standard manner. By modifying the sectors, in addition to the other safeguards, any potential copier would be faced with deciphering such non-standard configured data sectors.

The computer system includes well-known components, including at least a first disk drive for receiving the removable storage medium having the trading card software. The computer system also has computer memory and a processor/controller that communicates with the computer memory. In one embodiment, the computer memory is random access memory (RAM). In one embodiment, at least the trading card data is downloaded to the computer memory prior to or during the use of the trading card data. In another embodiment, the computer system includes a hard drive. The trading card data is downloaded to the hard disk resident with the hard drive for access and use by the processor in conjunction with executing the computer program of the trading card software. The computer system also includes a computer terminal display that provides the user with the graphics, text and action associated with the player or individual for the particular removable storage medium. Preferably, the computer system includes speakers for outputting the multimedia sound associated with the particular trading card.

In practicing the methodology associated with the present invention, a package containing removable storage media, with each having trading card data for one player or individual, is purchased or otherwise obtained. One of the removable media is inserted into the computer system. The computer system is checked for proper operation. Upon determining that the computer system is operation properly, the computer program of the trading card software is loaded into computer memory. The trading card data is loaded from the inserted removable medium into computer memory, in one embodiment. In another embodiment, the trading card data is copied to a fixed medium, such as a hard disk. After the loading is completed, the computer program begins execution and causes a display on the computer terminal display using parts of the trading card data. At this time, the display also includes interactivity areas that enable the computer user to interactively control the multimedia presentation. In that regard, the interactivity areas can be used to provide different available graphics, text and action video and, preferably, accompanying sound. In the case of a baseball player, for example, depending upon the predetermined interactivity area that is accessed or selected, the computer user is able to obtain a display of the baseball player in action, a picture of the baseball player and/or the baseball player's statistics.

The computer program, during execution, checks for a predetermined input (such as a predetermined interactivity area) from the user that is indicative that the user wishes to quit the program and stop using the trading card system. When such an input is received, the computer program of the trading card software causes the trading card data that has been stored on the computer memory or the hard disk or any other memory location, to be automatically cleared or deleted or eradicated. This prevents the computer user from maintaining unauthorized trading card software or subject data apart from the removable medium.

As part of the practice of the present invention, a computer user will wish to make a trade involving the player, individual or character to whom the trading card data is directed, which data is stored on a particular removable storage medium. That is, a computer user may have duplicate trading card data for one player on two removable media and another computer user may have duplicate trading card data for a different player on two removable media. And, these two computer users may want to trade their duplicates to obtain trading card data that they do not have. Since the trading card data is cleared each time the execution of the program is stopped, no computer user is able to store trading card data on a hard disk or other media for later use. Consequently, the objective that is sought is that no computer user will be able to simply access, and then return, trading card software from a number of computer users or purchasers of trading card software and store the trading card software on a hard disk for essentially permanent storage and later usage. In addition to preventing continued storage of trading card data on a medium other than the removable medium, the present invention maintains the trading card data in its encrypted form while it is stored in the computer memory or on the hard disk, and while it is not being used or executed by the trading card computer program.

Based on the foregoing summary, a number of advantages of the present invention are readily seen. A computer system uses trading card software to provide a multimedia subject display of individuals, including baseball players and action heroes. The trading card software is stored on removable and relatively inexpensive storage media to permit trading of trading card data that is accessible in connection with providing the multimedia display. Numerous and various copy protect schemes are applied to the trading card data. A computer user, having particular trading card data stored on one removable medium, is able to execute, or have available for execution, the trading card data essentially an unlimited number of times. However, the copy protect schemes are used to substantially reduce the likelihood that the computer user is able to maintain an essentially permanent storage on media different from the removable medium. Additionally, during operation and use of the trading card data, the computer terminal display facilitates interactivity by the computer user.

Additional advantages of the present invention will become readily apparent from the following discussion, particularly when taken together with the accompanying drawings.

DETAILED DESCRIPTION

Figure 1:
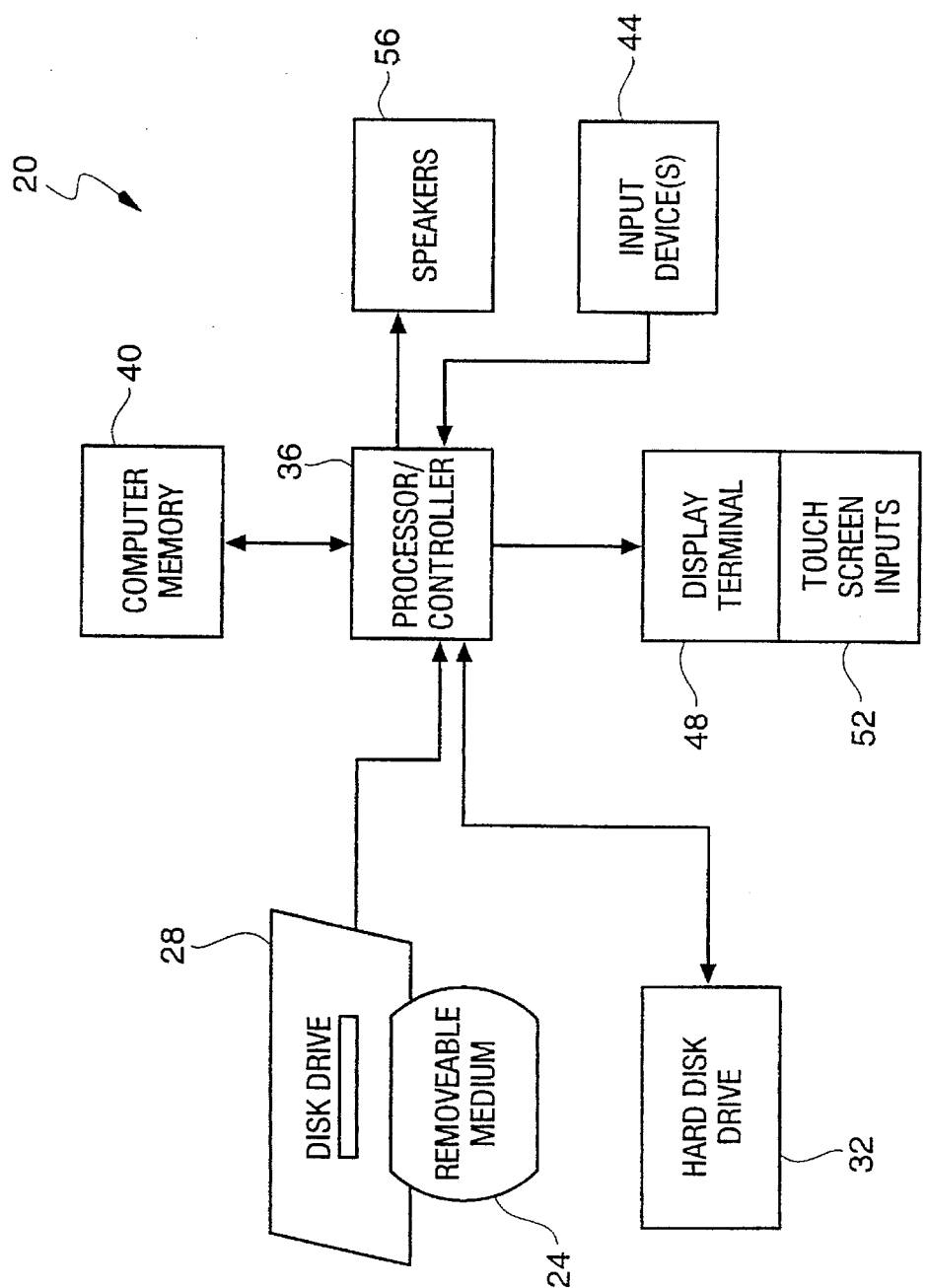
FIG. 1 is a block diagram illustrating computer hardware components of the present invention.

In accordance with the present invention, a system provides predetermined displays under control of a computer user while maintaining authenticity by way of copy protection. The predetermined displays reflect trading card data that is intended to be only permanently stored on removable media from an authorized source. Each removable medium can be traded for another removable medium. Preferably, the trading card data stored on each removable medium is directed to real or imaginary individuals or characters, such as ballplayers or action/adventure heroes. However, any person, place, or thing, may be the subject of the present system.

A computer system 20 operatively communicates with a removable medium 24 that contains trading card software. The trading card software is comprised of a computer program and trading card subject data. The computer program executes the trading card data in connection with providing a selected display. The medium 24 is insertable into and removable from a disk drive 28 that is useful in reading the program and data from the removable medium 24. In a preferred embodiment, the disk drive 28 reads the trading card data and the executable program from a floppy disk. The floppy disk is relatively inexpensive and is able to store the necessary program and data of the trading card software. The removable medium 24 is configured to be a read-only medium so that the medium 24 will not be written to in order to avoid writing over the trading card software. The system 20 may also include a hard disk drive 32, which may house one or more hard disks. In one embodiment of the invention, all or some of the trading card software may be copied to a hard disk for subsequent access in connection with providing selected predetermined displays using the trading card data. Both the disk drive 28 and the hard disk drive 32 communicate with a processor/controller 36 for executing and controlling the displaying and use of trading card software after insertion of the removable medium 24 into the disk drive 28. The processor/controller 36 is typically part of a small computer, such as a PC or Macintosh. The processor/controller 36 accesses the trading card software from the removable medium 24 and executes the program of the trading card software. Computer memory 40 is electrically connected to the processor/controller 36 and stores data useful for execution by the processor/controller 36. In one embodiment of the present invention, trading card data is transferred from the removable medium 24 to the computer memory 40. The computer memory 40 is commonly random access memory (RAM) for storing data that is more rapidly accessible by the processor/controller 36.

The system 20 further includes a number of other peripheral devices, including one or more input devices 44. Each input device is activatable by the computer user and may be useful in connection with user control of the execution of the trading card software. The input devices 44 may include a computer keyboard and/or a mouse, or any other device supporting input by the way of pointing, touching, vocalizing, or neural-electrical directing. A display terminal 48 also communicates with the processor/controller 36 for displaying, under control of the processor/controller 36 and the executable code, a selected predetermined display based on the trading card data. The displays can encompass a variety of data including a still picture of the individual or character, action video of the individual or character, performance statistics and a combination display of one or more of these displays. In a preferred embodiment, the display terminal 48 has touch screen inputs or interactivity areas 52 for controlling displays. In particular, once the trading card software is being executed and a particular display is being shown, that display also includes interactivity areas that can be touched or contacted by the computer user for use in changing the display. These will be discussed in greater detail in connection with a discussion of the kinds of predetermined displays that are available. With regard to producing the sounds for the preferred multimedia display, speakers 56 are electrically connected to the processor/controller 36 for receiving analog sound data. In that regard, the processor/controller 36 is defined to include a device, such as a digital-to-analog converter, for converting the digital data to analog data for transmission to the speakers 56.

Figure 2:
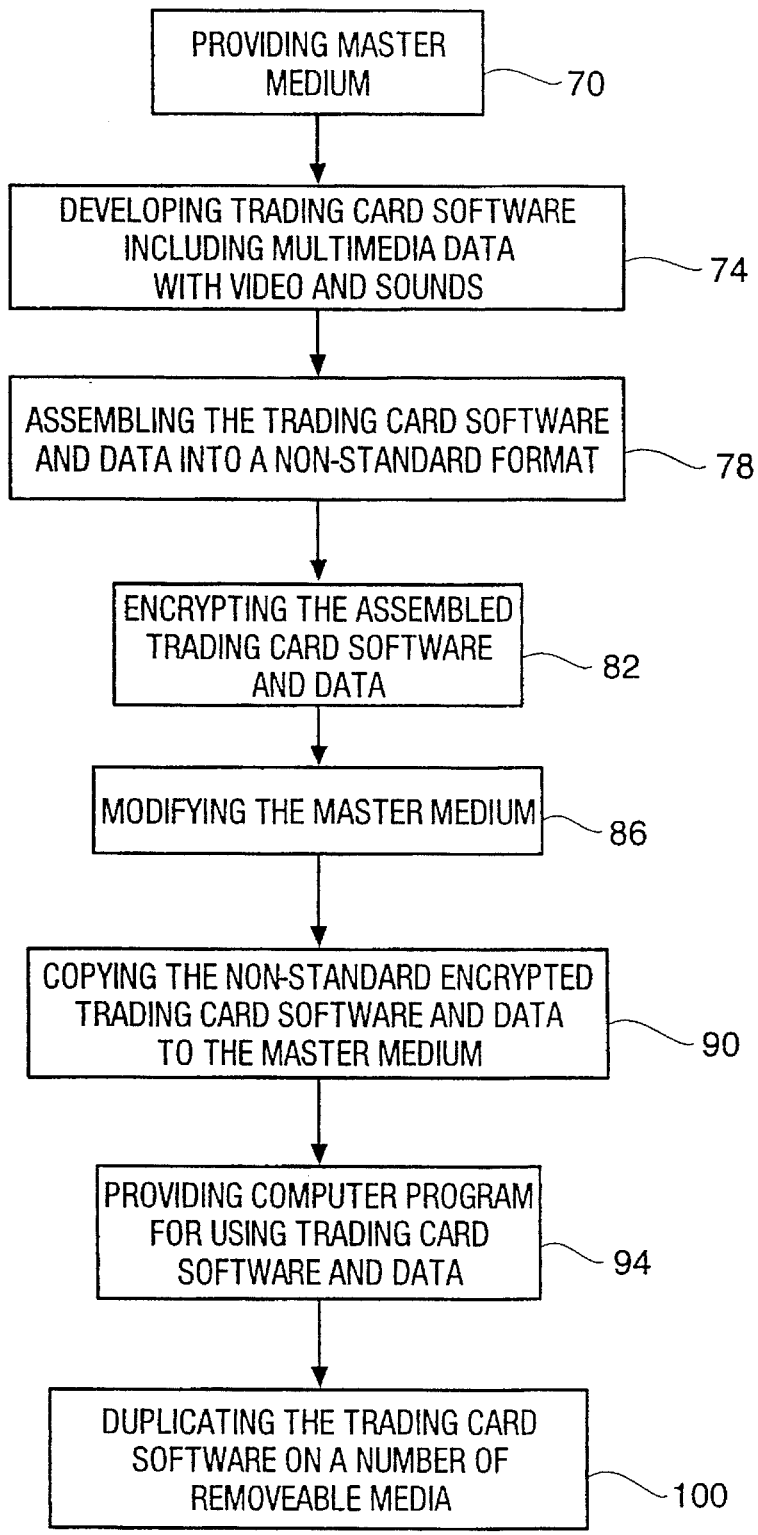
FIG. 2 is a step diagram identifying steps for providing removable media having copy protected trading card software thereon.

With reference to FIG. 2, a more detailed discussion of the trading card software will now be provided. As a preamble to this description of the trading card software, a key aspect of the present invention involves software copy protect schemes. As previously noted, it is intended and expected that computer users will exchange or trade removable media. That is, a first computer user owning a removable medium with trading card data for a first individual or character is able to trade that removable medium for another removable medium owned by a second computer user, with the removable medium of the second computer user having trading card data directed to a different individual or character. If one or more software copy protect schemes are not utilized, computer users may avoid exchanging trading card data and/or purchasing other trading card software by networking with others to obtain and store all trading card data for all of the different individuals or characters on a permanent storage medium, such as a hard disk. Consequently, in storing trading card software on each removable medium, a number of copy protect schemes or techniques are utilized.

As noted in FIG. 2, in producing removable media, each having trading card data for a particular individual or character, a master medium is utilized, as denoted in step 70. At step 74, the trading card software is developed for a particular individual or character. This data may include one or more of a number of multimedia data in the form of text, graphics, still pictures and/or action videos, as well as accompanying sound. After this developing step, the trading card software and/or subject data is assembled into a non-standard format, as indicated by step 78. It is common for data to be arranged in accordance with a standard format for accessing by a processor so that the data is immediately recognized by and applicable to the particular computer platform that will use the data. However, when standard formatted data is present, it is relatively easy for the computer user to copy the data. To reduce the ease of access and use, if the trading card data were improperly or wrongfully copied from the removable medium 24, the non-standard format acts as a substantial inhibitor to unauthorized use of the particular trading card data. More specifically, resource files that contain the trading card data are converted from a standard format that would allow the user to open these files in existing software. Using the non-standard format, even if a user were able to find the resource files, existing software could not open or make the contents of the files accessible.

An additional copy protect scheme for the trading card data is noted at step 82. After the display media data has been assembled, it is then encrypted so that the resulting encrypted data is provided in a sequence, layout or data arrangement that is different from normally presented data. To accomplish the encrypting, one or more of a number of different encryption algorithms or techniques is applied to the assembled trading card data. Such algorithms or techniques are well-known and utilized with other software. A further copy protect scheme is identified at step 86. Specifically, the master medium is modified so that it differs from commonly available master media. Such a modification might include having one or more sectors of a particular floppy disk, which acts as the master medium, be modified before the trading card software is copied thereto. After these copy protect schemes have been implemented, the non-standard, encrypted trading card data is copied to the master medium in accordance with step 90. At step 94, the executable computer program of the trading card software is also provided, such as being written to the same master medium that stores the trading card data for a particular individual 0r character. Alternatively, the computer program for executing the trading card data could reside on a different master medium. The last step, 100, of FIG. 2 indicates that the trading card software is then duplicated on a number of removable media. In the case where the executable code of the trading card software is provided on the same removable media, that computer program is also duplicated on each of these same removable media.

Figure 3A:
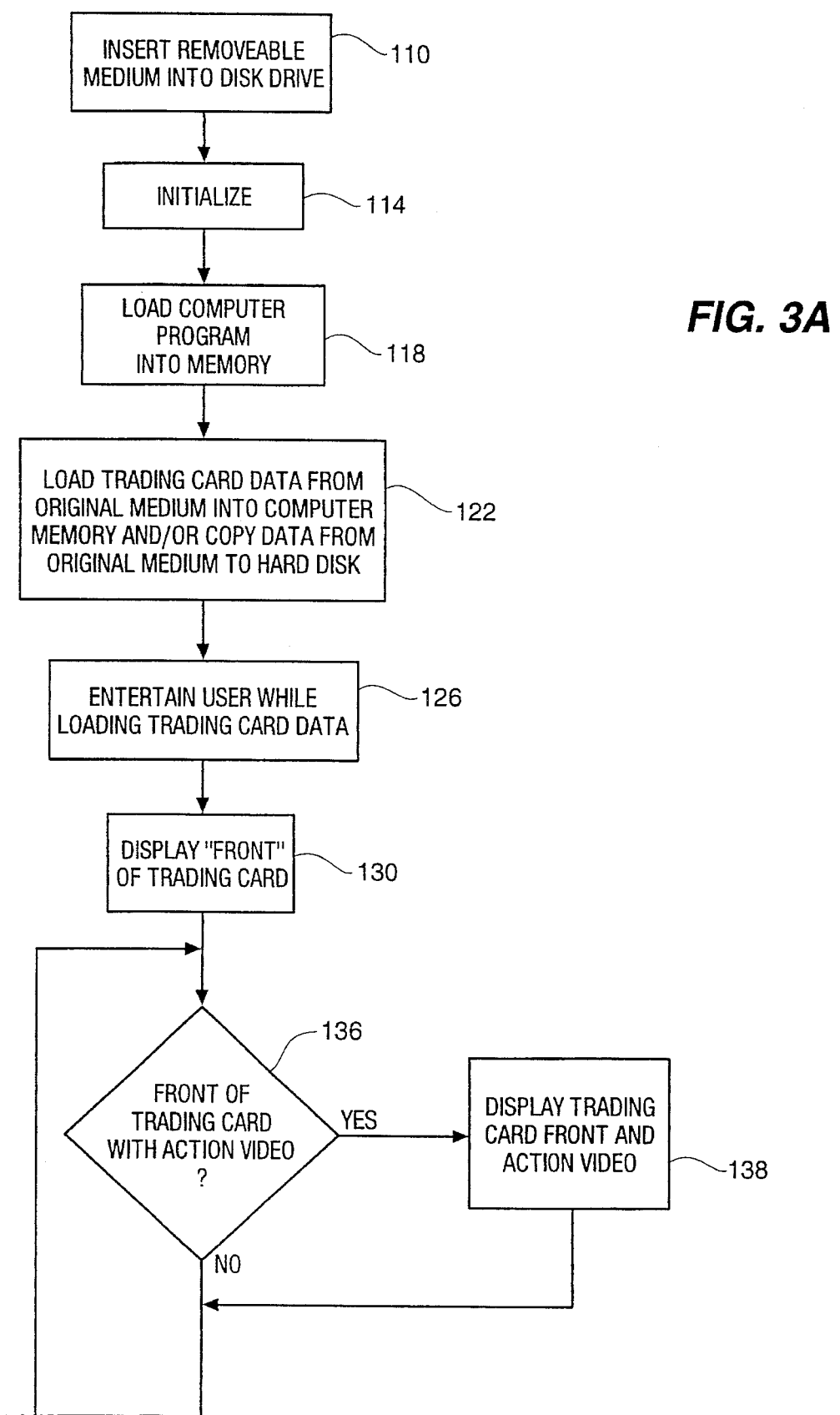
FIGS. 3A–3C are flow diagrams illustrating steps related to the operation of a particular removable medium having trading card software stored thereon.
Figure 3B:
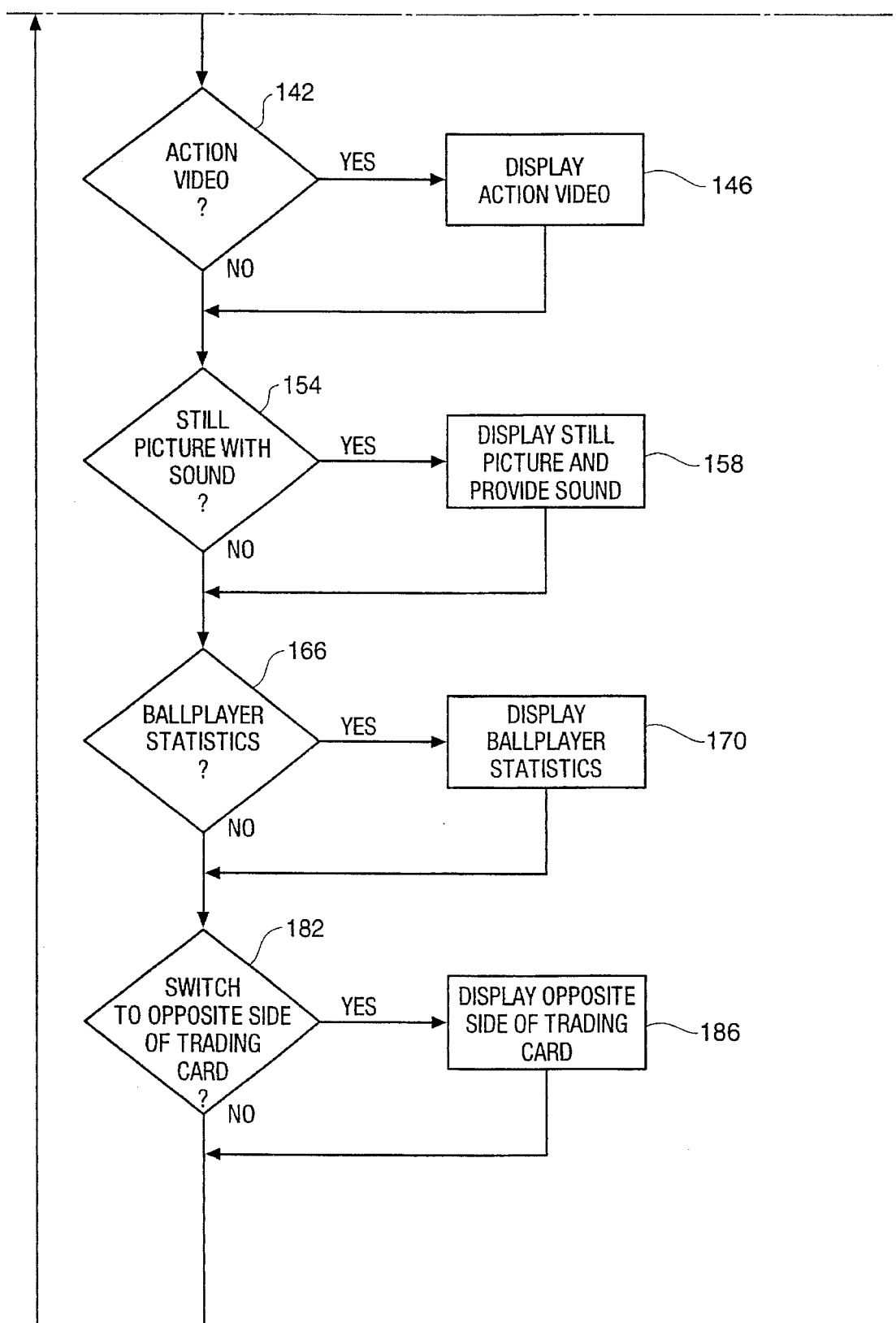
Figure 3C:
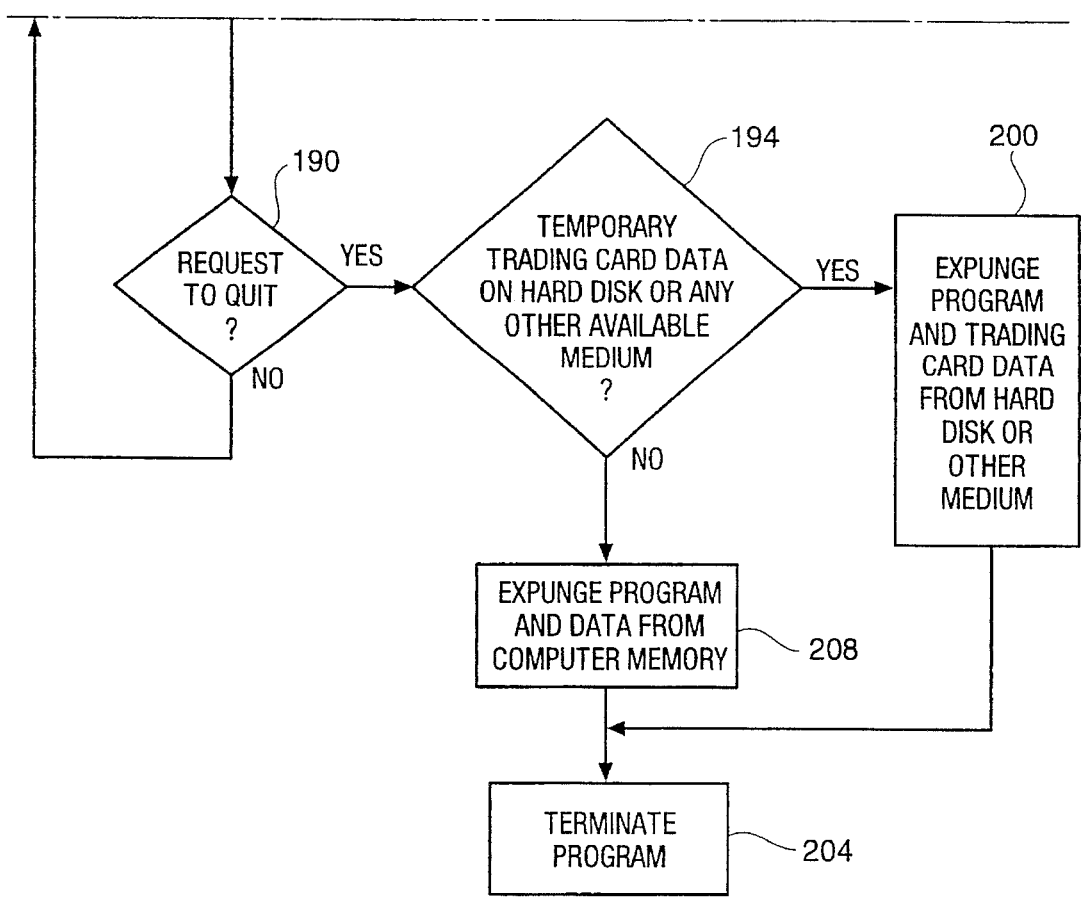

With a particular removable medium 24 directed to an individual or character, such as a ballplayer, inserted into the disk drive 28, an example of the operation of the system 20 is next described and with particular reference being given to the flow diagrams of FIGS. 3A–3C. At step 110, the computer user inserts a removable medium 24 having trading card software into the disk drive 28 of the computer system 20. The computer system 20 is then initialized at step 114 to check for operability, particularly determining whether or not any fault might exist with the computer system 20 or the removable medium 24 before execution of the trading card software. Subsequently, at step 118, the computer program of the trading card software is loaded into computer memory 40 by the processor/controller 36. From the computer memory 40, the processor/controller 36 can access and read the same in conjunction with the execution thereof. The trading card data, which includes the multimedia data, associated with the particular individual, is also loaded into the computer memory 40. Alternatively, the trading card data could be copied to the hard disk 32. Regardless of on which media the trading card data is stored on, it is available for use during execution of the trading card software computer program.

In one embodiment, at step 126, the computer program generates an entertaining display on the display terminal 48 during the time that the trading card data is being loaded or copied. Once the trading card data is appropriately stored, at step 130, the computer program automatically causes a predetermined display involving the specific subject associated with the removable medium 24. In the vernacular of hard copy trading cards, at step 130, a "front of the trading card" is displayed. The "front" of the card can be any predetermined display, such as a still photograph of the particular subject, such as a baseball player in uniform with baseball equipment, as depicted in FIG. 4.

At this time, the computer user is able to interactively select other predetermined displays in accordance with an interaction loop. In that regard, the displayed front of the trading card has a number of interactivity areas as part of the predetermined display. When a particular interactivity area is selected by user input, the computer program of the trading card software takes appropriate action in providing a predetermined display, based on the input or interactivity area selected. In one embodiment, no information is provided to the user as to which interactivity area causes a predetermined display. In such a case, the user is able to determine the correlation between an interactivity area and a display by touching a particular interactivity area and observing the resulting display.

Figure 4:
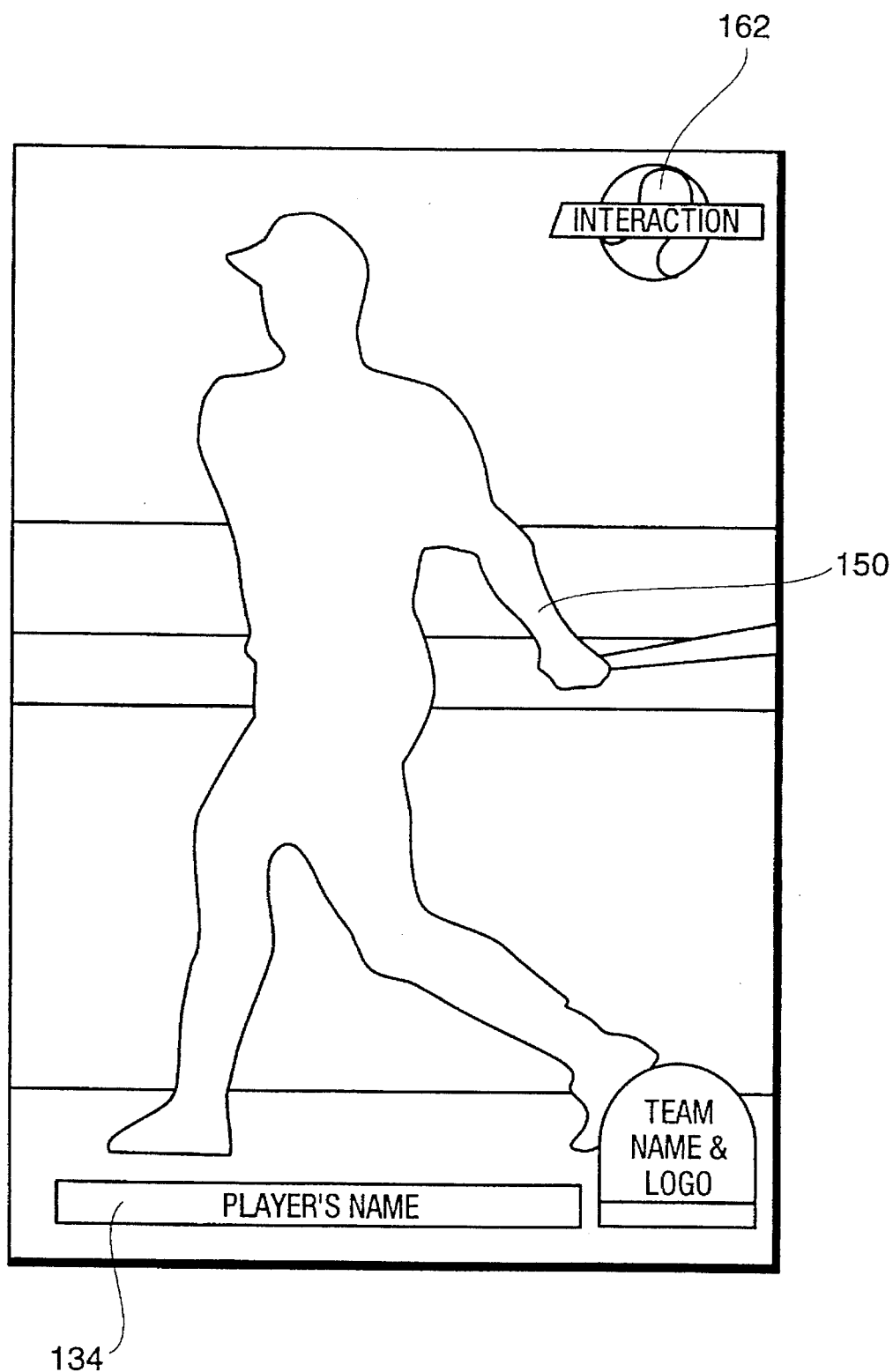
FIG. 4 illustrates an example of a computer terminal display using trading card software data that includes a picture or still photograph of a baseball player.
Figure 5:
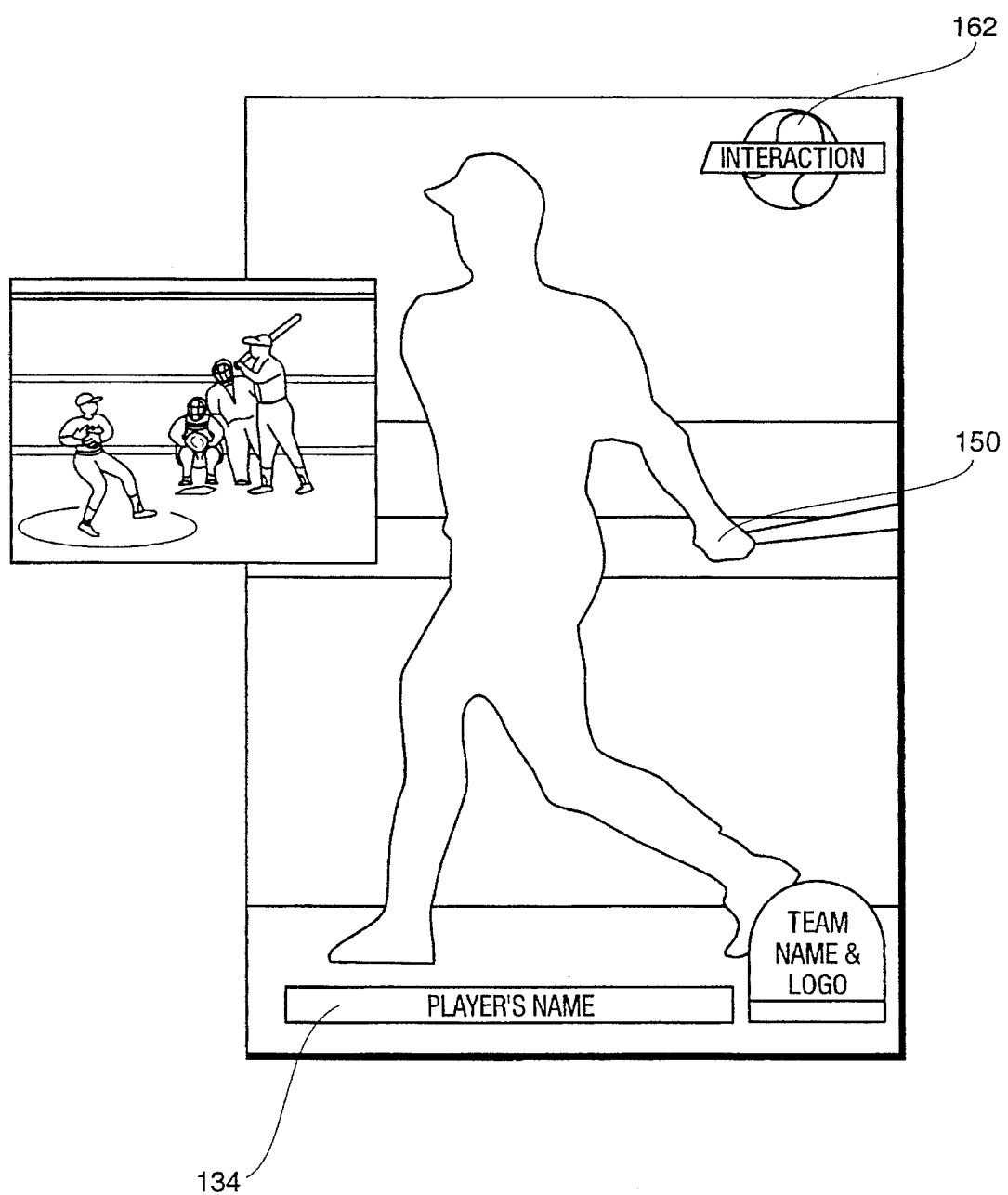
FIG. 5 illustrates an example of a computer terminal display of text, such as a player's statistics, for a baseball player.
Figure 6:
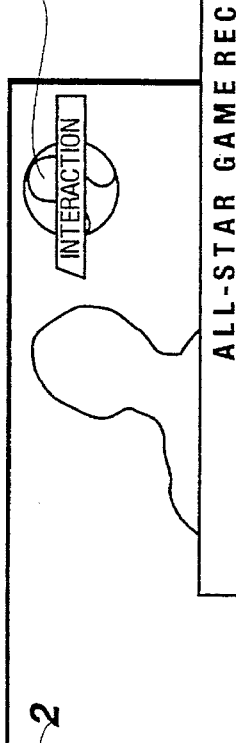
FIG. 6 illustrates an example of a computer terminal display of one of many continuous action scenes for a baseball player.

These touch or interactivity areas are described in the context of an example of multimedia data for an individual baseball player, as illustrated in FIGS. 4–6. More specifically, in this example, the "front" of the trading card is deemed to be a still photograph or picture of a baseball player just completing the swinging of his bat. The baseball player outline in FIG. 4 is intended to generically represent a professional baseball player. With respect to modifying the display to another predetermined display on the computer display terminal 48, the computer user select one of a number of interactivity areas. As seen in FIG. 4, there is a box 134 for containing the player's name. If a predetermined part of box 134 is selected by the computer user, an action video is also displayed, in combination with the individual's still picture, as illustrated in FIG. 5. This is step 136 of Fig. 3A, which indicates that the computer program checks for user input including whether or not the box 134 was selected. When the box 134 is selected at the appropriate part, at step 138, the action video is also displayed, together with the still photograph of the player, in this example. The action video includes, in this example, a pitcher throwing a baseball to the specific ballplayer and a continuous sequence of shots or scenes involving the pitched ball and the ballplayer swinging. As can be appreciated, other action sequences of the ballplayer can be included or substituted for any particular action sequence. If the box 134 has not been selected or activated, the trading card computer program continues its check for other user input, as indicated at step 142. In accordance with this step, instead of action video being displayed together with the still picture, the action video is displayed by itself. This input at step 142 could be in addition to the step at 138 or be a substitute for that step. That is, rather than box 134 being activated and showing a combination of a still picture and an action video, activation thereof could result in a display of only the action video. In such an embodiment, at step 146, the action video alone would be displayed on the computer terminal display screen 48.

In one embodiment, the computer user has the option to display a photograph of the individual or character, with sound, such as the voice of the ballplayer. In the representative example of the baseball player in FIG. 4, this display could be activated by the computer user selected the hand area 150 of the baseball player depicted on the computer display terminal 48. The computer program checks for the activation of the interactivity area 150 in accordance with step 154. If such an activation does occur, the selected display is presented that includes the still ballplayer's picture with sound, in accordance with step 158. With respect to further displays, in the illustrated embodiment, to display the "back" of the trading card, interactivity area 162 is selected by the computer user. When this activation occurs, the computer program, at step 166, determines that this input has been received and causes a display of, in the example of this embodiment, baseball player statistics at step 170. Representative statistics for the baseball player of this embodiment are illustrated in FIG. 6. This predetermined display may also include a continued static picture of the ballplayer or may present only the ballplayer's statistics. In the embodiment in FIG. 6, a static picture of the ballplayer is also provided, as well as further selected interactivity areas 174,178. When selected, the interactivity area 174 switches to provide a display of the "opposite side" of the trading card. That is, if the "back side" of the trading card is deemed to be the display of FIG. 6, the selecting of the area 174 causes a return to the "front side" of the trading card, which is FIG. 4 in the present example. The computer program of the trading card software checks for this occurrence at step 182. When selectable area 174 is activated, at step 186 of FIG. 3B, the computer terminal returns the display to that of FIG. 4.

The computer program also checks, at step 190 of FIG. 3C, as to whether or not the computer user has inputted a command directed to quitting the program. In the embodiment of the present example, interactivity area 178 is contacted by the user. When this input is recognized by the computer program, steps are taken to terminate the program and the current display. In that regard, at step 194, the computer program determines whether trading card data was copied to a hard drive 32 or other storage medium associated with the computer system of the user. In the case in which trading card data was copied to the hard drive 32 or such other media, the trading card data is deleted from this medium, eradicated or otherwise rendered non-usable. That is, after quitting the program, any trading card data stored on such a medium is no longer available for use in providing predetermined displays. Once this safeguarding step is completed, at step 204, the computer program of the trading card software is terminated and the removable medium 24 can be removed from the disk drive 28. In an embodiment in which the trading card data is written to the computer memory 40, at step 208, this computer memory is cleared to delete or otherwise render non-usable any trading card data, upon quitting of the program. With this step completed, just as with the embodiment involving a hard disk or other media, the program is terminated at step 204.

With respect to storing trading card data in computer memory 40, on a hard disk 32 and/or some other medium, the trading card data is decompressed from its compressed state, when stored on the removable medium 24. The computer program of the trading card software executes a standard decompression algorithm. However, when being stored in computer memory or on the hard disk or any other medium, the trading card data remains encrypted and configured in a non-standard format. When the processor/controller 36 accesses the trading card data, it then appropriately configures the trading card data for providing each of the predetermined displays, on selection thereof. As a consequence, during such temporary storage of the trading card data separately from the removable medium 24, any user attempting to copy or otherwise provide a permanent storage of the trading card data, apart from the removable medium 24, will be faced with these copy protect schemes in addition to the deletion of the trading card data after quitting the program.

Although the embodiment disclosed is directed to a baseball player, it should be understood that the individual conveyed by the trading card data could be any sports player, as well as any other individual or character that has become sufficiently famous for representation in trading card software for trading purposes. Such individuals or characters can be real or imaginary and might include television or movie action heroes. Even though the embodiment described refers to a single individual, it should be appreciated that the trading card data on a single removable medium could be directed to more than one individual, such as a few team members or an entire ballplayer and/or action team or any other person, place, or thing. It is also noted that in the disclosed embodiment, the removable medium is a floppy disk; however, any removable medium could be utilized, with the objective being that the medium be as inexpensive as feasible, while being able to store the trading card software with the predetermined and desired number of displays.

Figure 7:
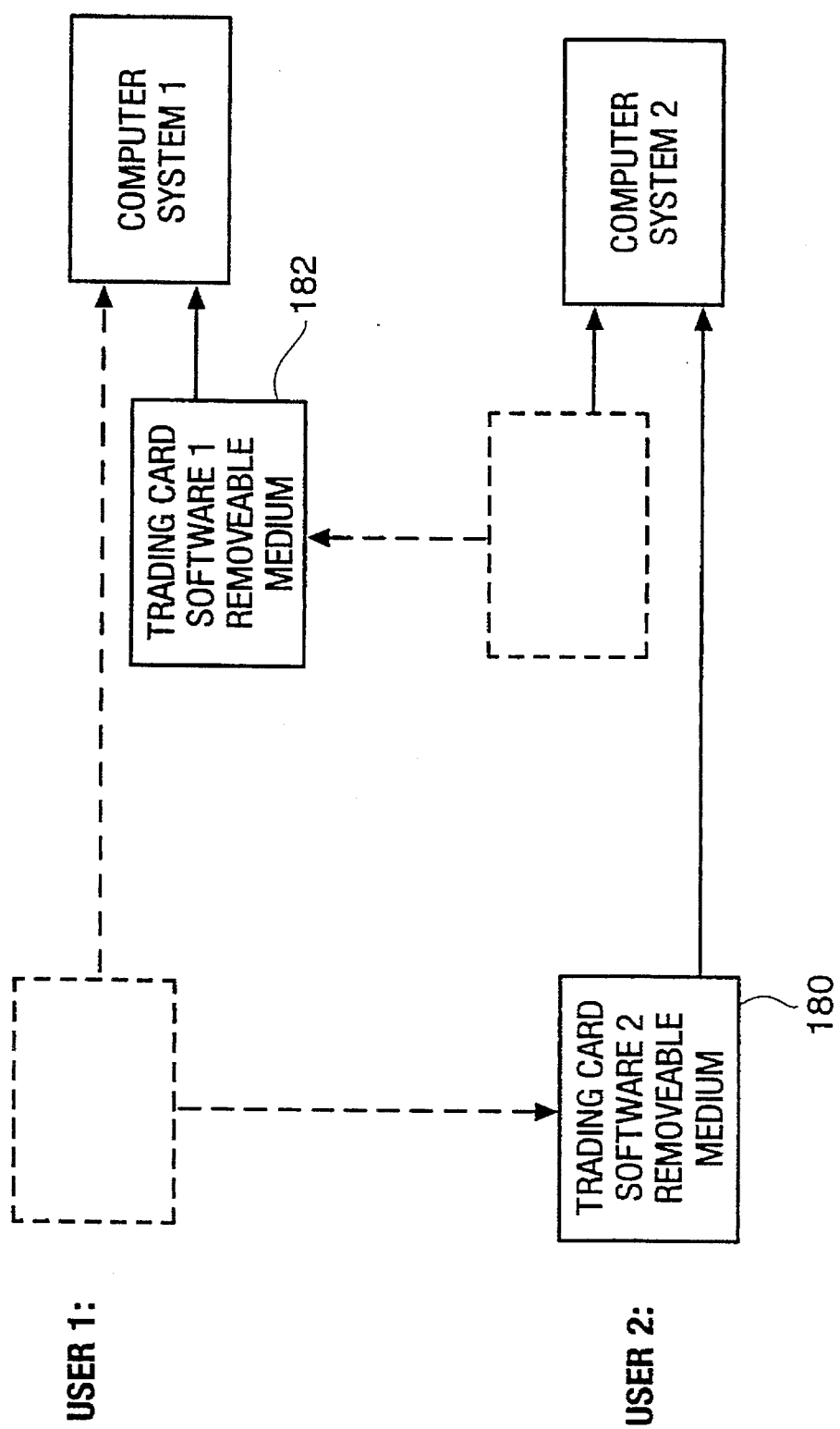
FIG. 7 is a block diagram illustrating the trading of trading card data contained on two removable media.

With regard to the trading aspect of the removable medium 24, together with protecting against copying or permanently maintaining trading card software data on a medium other than an authorized or original removable medium 24, reference is made to FIG. 7. In a preferred embodiment, each removable medium has trading card data for one specific individual or character. In connection with a computer user obtaining removable media, each being directed to a single individual or character, it is preferred that a number of removable media be packaged together, with the trading card data on each of the packaged removable medium be different from each other. When a package of removable media is first obtained by a first user, the first user is not aware of the particular individuals or characters that are reflected in the trading card data or the packaged removable media. When this user finds out the identities of the individuals or characters reflected by the trading card data on the removable media, such a user may have duplicate trading card data because she/he previously obtained a removable medium having duplicate trading card data from a different package. In such a case, to avoid having duplicate trading card data and in order to obtain trading card data for another individual or character that the computer user does not have, the removable medium having duplicate trading card data can be traded for another removable medium having trading card data for another individual. This is represented in FIG. 7 in which User 1 trades or exchanges Trading Card Software 1 on a first removable medium that was, or could be, executed on Computer System 1 for Trading Card Software 2 found on a second removable medium. Trading Card Software 2 was, or could be, used with Computer System 2. For each Trading Card Software 1 and Trading Card Software 2, each could be essentially executed an unlimited number of times on respective Computer System 1 and Computer System 2. However, after the trade is made, a reverse utility is present. That is, Trading Card Software 1 on the first removable medium is executable an unlimited number of times on Computer System 2 of User 2. Correspondingly, Trading Card Software 2 on the second removable medium is executable an unlimited number of times on Computer System 1 of User 1. Because of the copy protect schemes that are utilized in storing trading card software on removable media, as well as the removing of trading card data from any storage medium, which is part of the computer system that executes the trading card software, trading card data is not available for use by the trader/user after it is traded or exchanged.

The foregoing description of the present invention has been presented for purposes of illustration and description. Furthermore, the description is not intended to limit the invention to the form disclosed herein. Consequently, variations and modifications commensurate with the above teachings, and within the skill and knowledge of the relevant art, are part of the scope of the present invention. The embodiments described hereinabove are further intended to explain best modes known of practicing the invention and to enable others skilled in the art to utilize the invention in such, or other embodiments and with various modifications required by the particular applications or uses of the present invention. It is intended that the appended claims be construed to include alternative embodiments to the extent permitted by the prior art.

What is claimed is:

1. An electronic trading card system for use in a processor, said processor having a memory and an apparatus for reading from a removable storage media, said system comprising:

means for loading a copy protected form of a control program and subject data into said memory from said removable storage media;

means for maintaining said control program and said subject data in said copy protected form when resident in said memory; and means for expunging said control program and said subject data from said memory when said control program ceases executing.

2. A system according to claim 1, having an apparatus for writing to a removable storage media, said system further including:

means for generating a master copy of said control program and said subject data in a non-standard file format;

means for encrypting said master copy having said non-standard file format; and means for duplicating said master copy onto said removable storage media to provide portability and maintain authenticity of said control program and said subject data.

3. A system according to claim 2, wherein said means for generating includes:

means for altering at least one sector of said master copy of an otherwise standard sector file format for said removable storage media.

4. A system according to claim 2, wherein said copy protection means further includes:

means for compressing at least one said master copy onto said removable storage media.

5. A system according to claim 1, wherein said means for loading includes:

means for decompressing said copy protected form of said control program and said subject data.

6. A system according to claim 1, said processor further having a display device for producing output in at least one form selected from the group consisting of: audio, fixed visual, and moving visual, and a user input device for accepting a user input command in at least one input form selected from the group consisting of: typing, pointing, touching, vocalizing, and neural-electrical directing, said system further including:

means, responsive to said means for loading, for relinquishing control of said processor to said control program to construct a subject display from said subject data by way of said display device, wherein said subject display includes at least one subject selected from the group consisting of: a person, a place, and a thing; and means, responsive to said user input command, for generating at least one highlight of said subject display by way of said display device.

7. A system according to claim 6, wherein said subject display includes:

means for generating at least one fixed visual display perspective selected from the group consisting of: a front perspective, and a back perspective.

8. An electronic trading card system on a processor, said processor having an apparatus for writing to a removable storage media, said system comprising:

means for generating a master copy of a control program and subject data in a non-standard file format, wherein said non-standard file format includes altering at least one sector of said master copy of an otherwise standard sector file format for said removable storage media;

means for encrypting said master copy having said non-standard file format;

means for compressing at least one said master copy onto said removable storage media to provide portability and maintain authenticity of each of said control program and said subject data.

9. A method for using an electronic trading card system with a processor, said processor having a memory, and an apparatus for reading from a removable storage media, said method comprising the steps of:

loading a copy protected form of a control program and subject data into said memory from said removable storage media;

maintaining said control program and said subject data in said copy protected form when resident in said memory; and expunging said control program and said subject data from said memory when said control program ceases executing.

10. A method according to claim 9, having an apparatus for writing to a removable storage media, said method including the steps of:

generating a master copy of said control program and said subject data in a non-standard file format;

encrypting said master copy having said non-standard file format; and duplicating said master copy onto said removable storage media to provide portability and maintain authenticity of said control program and said subject data.

11. A method according to claim 10, wherein said generating step includes:

altering at least one sector of said master copy of an otherwise standard sector file format for said removable storage media.

12. A method according to claim 10, wherein said duplicating step includes:

compressing at least one said master copy onto said removable storage media.

13. A method according to claim 9, wherein said loading step includes:

decompressing said copy protected form of said control program and said subject data.

14. A method according to claim 9, said processor further having a display device for producing output in at least one form selected from the group consisting of: audio, fixed visual, and moving visual, and a user input device for accepting a user input command in at least one input form selected from the group consisting of: typing, pointing, touching, vocalizing, and neural-electrical directing, said system further including:

relinquishing control of said processor to said control program to construct a subject display from said subject data by way of said display device, in response to said loading step, wherein said subject display includes at least one subject selected from the group consisting of: a person, a place, and a thing; and generating at least one highlight of said subject display by way of said display device, in response to said user input command.

15. A method according to claim 14, wherein said generating step includes:

generating at least one fixed visual display perspective selected from the group consisting of: a front perspective, and a back perspective.

16. A method for preparing an electronic trading card system on a processor, said processor having an apparatus for writing to a removable storage media, said system comprising:

generating a master copy of a control program and subject data in a non-standard file format, wherein said non-standard file format includes altering at least one sector of said master copy of an otherwise standard sector file format for said removable storage media;

encrypting said master copy having said non-standard file format; and compressing at least one said master copy onto said removable storage media to provide portability and maintain authenticity of each of said control program and said subject data.

* * * * *